United States Patent
Tasaka et al.

[19]

[11] Patent Number: 6,149,475
[45] Date of Patent: Nov. 21, 2000

[54] TILLER MOUNTING ARRANGEMENT

[75] Inventors: Yoshiaki Tasaka; Toshihiro Nozue; Kentaro Kameoka; Noritoshi Suzuki, all of Hamamatsu, Japan

[73] Assignee: Sanshin Kogyo Kabushiki Kaisha, Shizuoka-ken, Japan

[21] Appl. No.: 09/221,041

[22] Filed: Dec. 28, 1998

[30] Foreign Application Priority Data

Dec. 26, 1997 [JP] Japan ................................. 9-359775

[51] Int. Cl.$^7$ .................................................. B63H 21/30
[52] U.S. Cl. ............................. 440/52; 440/53; 440/900; 248/640; 267/153; 267/136; 267/141.2; 267/141.3
[58] Field of Search ................................ 440/52, 53, 900; 248/640; 267/153, 136, 141.2, 141.3

[56] References Cited

U.S. PATENT DOCUMENTS

| | | |
|---|---|---|
| 4,507,090 | 3/1985 | Kobayashi et al. . |
| 5,145,427 | 9/1992 | Kawai et al. . |
| 5,219,306 | 6/1993 | Takahashi . |
| 5,443,406 | 8/1995 | Mondek et al. . |
| 5,755,603 | 5/1998 | Kumita . |
| 5,799,925 | 9/1998 | Kumita et al. . |

FOREIGN PATENT DOCUMENTS

| | | |
|---|---|---|
| 3145337 A1 | 5/1983 | Germany . |
| 03311648 | 10/1991 | Japan . |

Primary Examiner—S. Joseph Morano
Assistant Examiner—Ajay Vasudeva
Attorney, Agent, or Firm—Knobbe, Martens, Olson & Bear LLP

[57] ABSTRACT

An outboard motor is configured for steering by a tiller arm. The tiller arm is moveable relative to the outboard motor about a transverse axis and is arranged to steer the motor about the vertical axis. The outboard motor further has a power head that contains a vibration engine and is comprised of a protective cowling and lower tray. A tiller arm mounting bracket is secured to the power head and a mounting structure extends from the tiller arm. A resilient member is juxtaposed between the mounting bracket and the mounting structure. A gap is defined between a face of the resilient member and the tiller arm such that the resilient member may freely vibrate within the gap without that face of resilient member contacting the tiller and directly translating vibrational energy to the tiller arm.

22 Claims, 8 Drawing Sheets

TILLER MOUNTING ARRANGEMENT

BACKGROUND OF THE INVENTION

1. Field of the Invention

The present invention relates to a steering arrangement for an outboard motor. More particularly, the present invention relates to a resilient mounting arrangement for a tiller arm of such a motor.

2. Description of Related Art

Outboard motors are provided with steering handles, or tillers, which are used to steer associated watercraft by moving the motor about a steering axis. The outboard motors also house a powering internal combustion engine. As is known, the internal combustion engine is prone to vibration and resonation at varying speeds. Accordingly, a large portion of the vibrations set up by the engine is transmitted to the casing which houses the engine and to which the engine is mounted.

Because the tiller must be coupled to the motor to effect steering movement of the motor, a large portion of the engine vibrations may be transferred from the casing to the tiller. The vibrations are then transferred to the operator of the watercraft and may cause a numbing sensation in the operator's arm or other discomforts.

SUMMARY OF THE INVENTION

A few early attempts at vibration damping, which have proven inadequate, are introduced below within a first portion of the detailed description. Accordingly, there is a need for a mounting arrangement for a tiller arm that reduces the level of vibrations transferred from the outboard motor to the tiller arm and ultimately to the operator of the watercraft.

One aspect of the present invention involves an outboard motor. The outboard motor generally comprises a power head. A mounting bracket is connected to the power head. An outer sleeve has an exterior surface abutting against the mounting bracket and an interior surface abutting against an exterior surface of a resilient member. An interior surface of the resilient member abuts against an exterior surface of an inner sleeve while an interior surface of the inner sleeve is preferably positioned adjacent a transversely extending mounting boss of a tiller arm. The inner sleeve desirably extends transversely between a washer and a mounting surface of the tiller arm such that the washer and the mounting surface may compress the inner sleeve. Preferably, a pair of gaps are defined such that one is between the ends of the resilient member and the outer sleeve and the washer and the other is between the other ends of the resilient member and the outer sleeve and the mounting surface. In this configuration, vibrations must pass through the outer sleeve to the resilient member then through the resilient member into the inner sleeve prior to being transferred to the tiller arm.

Another aspect of the present invention involves an outboard motor. The motor generally comprises a power head. A resilient member is desirably juxtaposed between the mounting bracket and a mounting structure of a tiller arm. The resilient member is then joined to the mounting structure through an inner surface wherein a gap is defined at both ends of the resilient member between the resilient member and the next adjacent surface. In this configuration, vibrations must pass through the inner surface of the resilient member into the tiller arm.

Yet another aspect of the present invention relates to an outboard motor. The outboard motor desirable includes an engine within a housing and a handle. The handle is attached to the engine housing through a resilient member. The resilient member is arranged so as to freely vibrate within a gap defined between the engine housing and the handle and a contact element is arranged on the handle such that it may selectively contact the engine housing.

BRIEF DESCRIPTION OF THE DRAWINGS

These and other features of the invention will now be described with reference to the drawings of several presently preferred embodiments that are intended to illustrate and not to limit the invention, and in which drawings.

DESCRIPTION OF EARLIER ARRANGEMENT AND DISCOVERY OF PROBLEM

Figure 1:
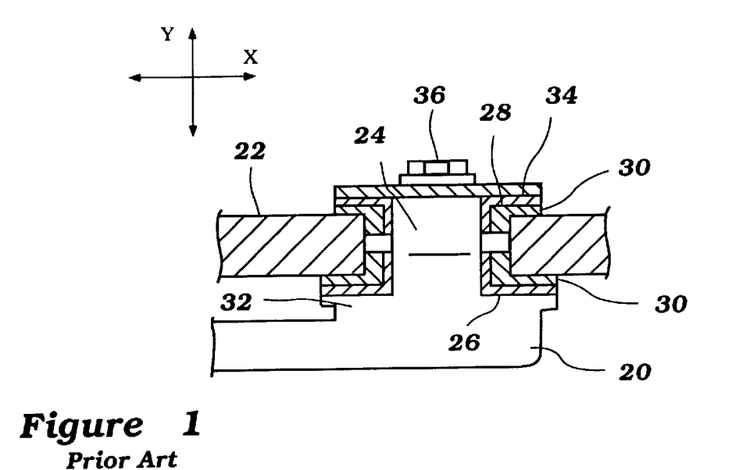
FIG. 1 is a partially sectioned view of a prior tiller arm mounting arrangement, illustrating a directly coupled steering bracket and tiller arm.

With reference to FIG. 1, a prior mounting arrangement and some drawbacks of such a mounting arrangement will be introduced. The prior mounting arrangement for mounting a tiller arm 20 to a steering bracket 22 involved directly coupling the tiller arm 20 to the steering bracket 22.

As illustrated, the tiller arm has a transversely extending mounting boss 24 that originates near the tiller arm's distal end and extends outward in the Z direction. The mounting boss extends through an aperture within the steering bracket 22. A set of bushing sleeves 26, 28 encase the mounting boss 24 and provide a load bearing surface which allows the tiller arm 20 to be rotated relative to the steering bracket about the Z axis. The tiller arm 20 cannot rotate vis-a-vis the Y-axis relative to the motor. Accordingly, the tiller arm may be used to pull or push the motor about the Y-axis for steering as will be described below.

With continued reference to FIG. 1, the prior tiller arm mounting arrangement utilized high spring constant resilient collars 30 which were clamped in position between a raised neck 32 and a flat washer 34. The collars 30 contacted the bracket 22 on three sides, thus allowing a large portion of the engine vibrations to be transferred between the bracket 22 and the tiller arm 20. A threaded fastener 36 held the assembly together with sufficient tension to allow the tiller arm 20 to be positively held in position when released while still allowing the tiller arm 20 to be pivoted about the Z axis. The problem with such an arrangement is that any damping afforded by the configuration had to be reduced from an optimal damping because the resilient collars had to be manufactured from a high spring constant rubber which tends to be hard and does not easily deform.

Figure 2A:
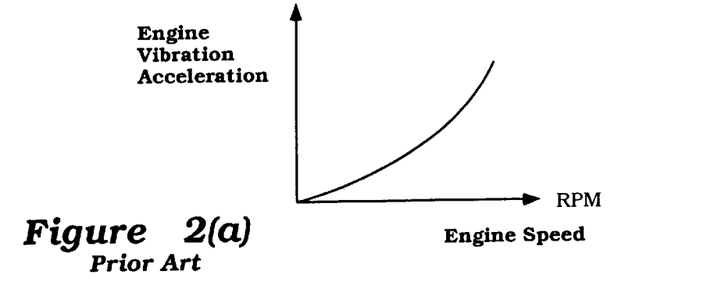
FIGS. 2(a)–2(c) are graphical representations of engine vibration as a function of engine speed, vibration damping factors and vibration transmission through the prior art tiller arm, (FIG. 1) respectively.
Figure 2B:
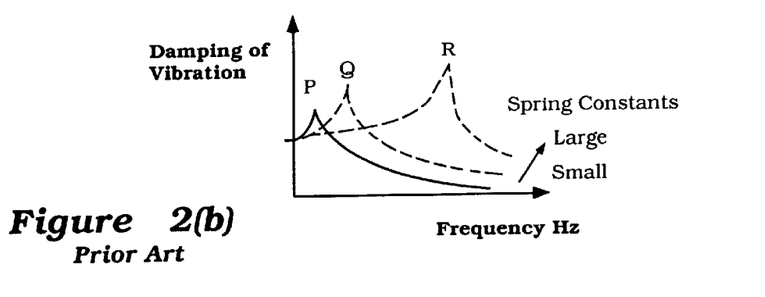
Figure 2C:
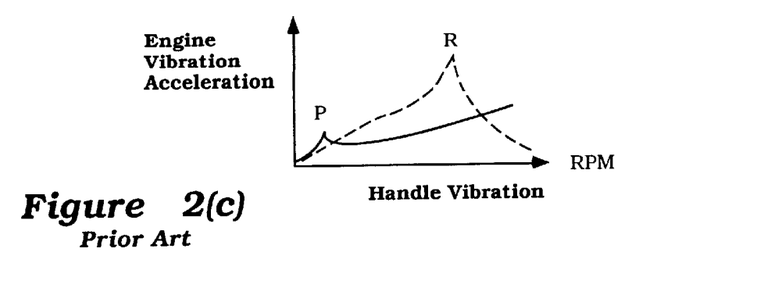

Additionally, because high spring constant rubber collars 30 must be used, the configuration does not significantly reduce the transfer of engine vibrations from the engine to the tiller arm 20. With reference to FIGS. 2(a)–2(c), the increase in engine vibrations as a function of engine acceleration and the transfer of the vibrations are graphically depicted. FIG. 2(a) illustrates the increase of engine vibrations as a secondary function of engine acceleration. Moreover, FIG. 2(b) illustrates a vibration damping factor of the resilient collars 30 of each peak vibration (i.e., at a resonant frequency) P, Q and R. As illustrated, the harder the rubber (i.e., the larger the spring constant), the larger the engine vibrations which result. For instance, dotted line R is associated with a large vibration at a resonant frequency and the corresponding line of FIG. 2(c) teaches that the handle will feel a large vibration even though the connection utilizes the damping rubber collars 30. Accordingly, a tiller arm mounting arrangement is desired that can reduce the amplitude of vibrations transferred to the tiller arm from the engine.

DETAILED DESCRIPTION OF THE PREFERRED EMBODIMENTS OF THE INVENTION

Figure 3:
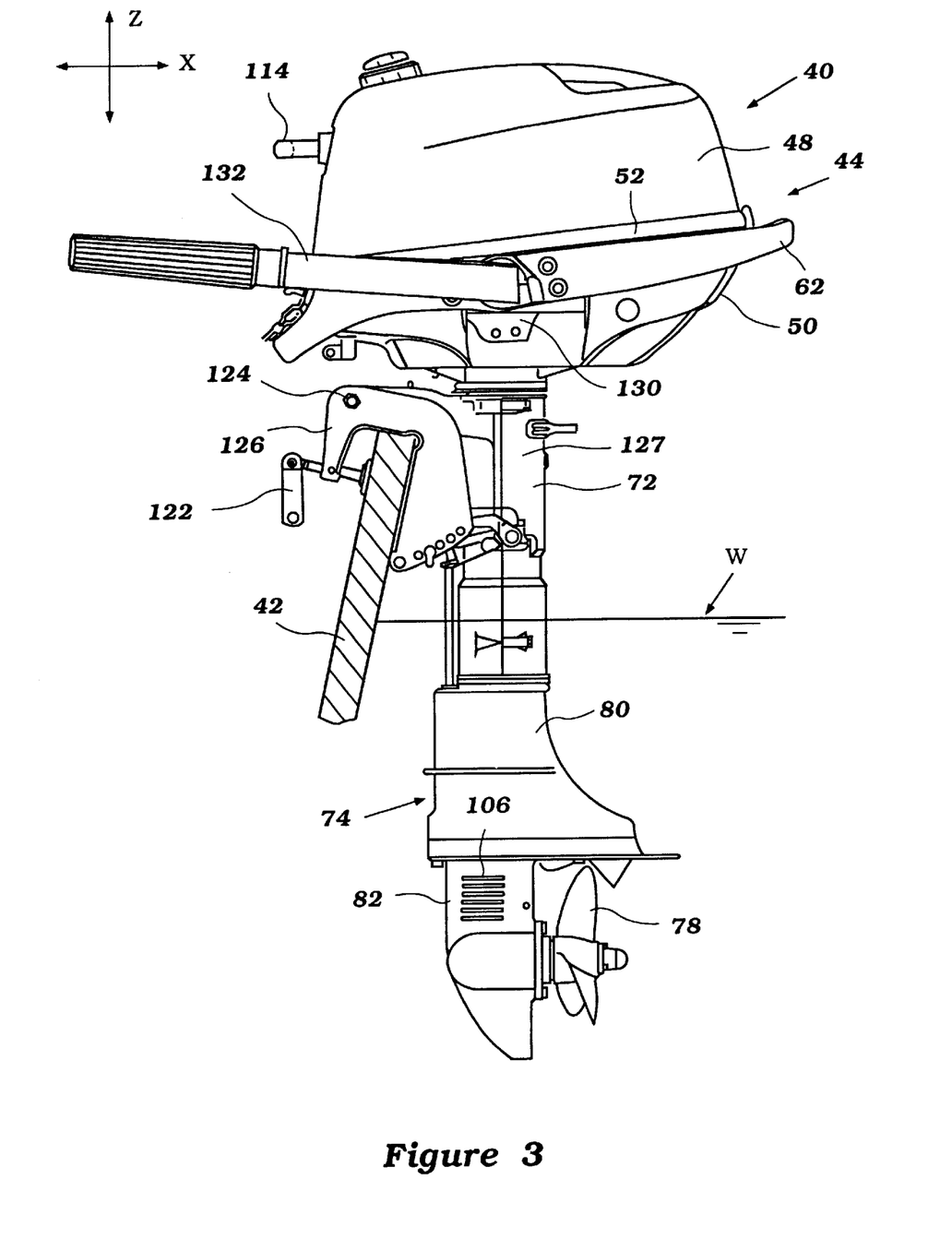
FIG. 3 is a side view of an outboard motor having features, aspects and advantages in accordance with the present invention.

With reference now to FIG. 3, an exemplary environment of a small outboard motor will be introduced with which the present invention finds great utility. While various embodiments having aspects, features and advantages of the present invention will be introduced with reference to such an environment, it is to be appreciated that the present invention may also find utility in other motors and configurations.

The exemplary outboard motor, indicated generally by reference numeral 40, is adapted to be mounted, in a manner which will be described, on a transom 42 of a hull of a watercraft. A portion of the transom 42 is illustrated in FIG. 3 in cross-section. The outboard motor 40 generally comprises a power head, indicated generally by the reference numeral 44, that includes an internal combustion engine 46 (depicted in FIG. 5) which is concealed within a cowling 48 and a lower tray 50 in a known manner.

Figure 4:
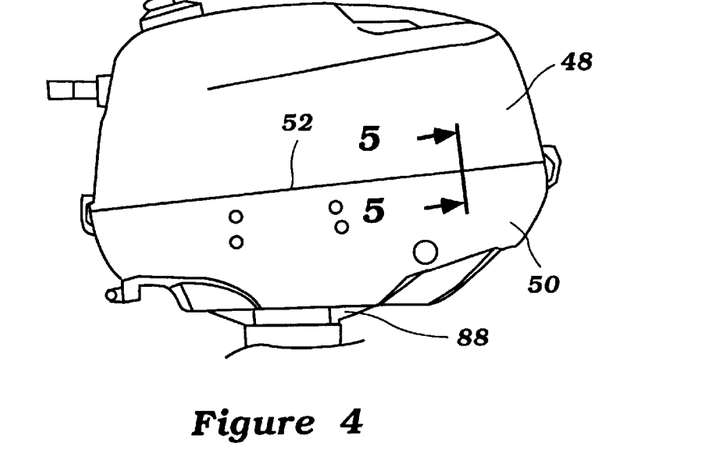
FIG. 4 is a side view of another arrangement for a power head for use with the present invention.

With reference now to FIG. 4, the cowling 48 and lower tray 50 are assembled together to form a weatherproof chamber for the engine 46. The two components 48, 50 are joined at a bond line 52.

Figure 5A:
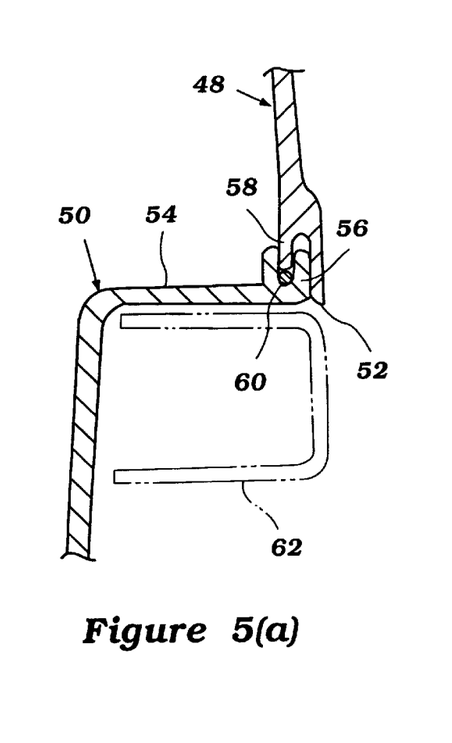
FIGS. 5(a)–5(c) are enlarged cross-sections of various presently preferred embodiments of joints between a cowling and a tray of the power head of FIG. 4 taken through line 5—5.
Figure 5B:
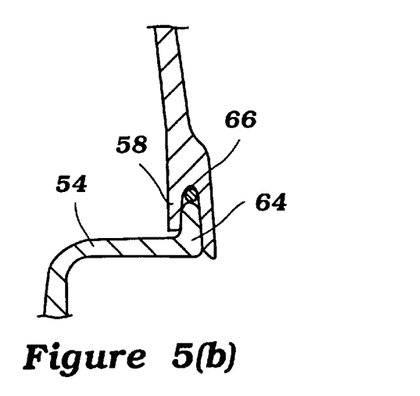
Figure 5C:
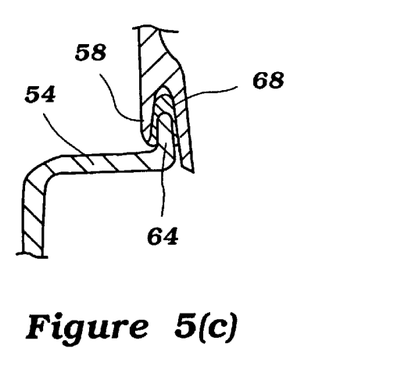

With reference to FIGS. 5(a), 5(b) and 5(c), several joining arrangements of the cowling 48 and the lower tray 50 will be introduced. As illustrated in FIG. 5(a), the tray 50 extends outward from the engine in a flat lip portion 54. A carrying handle 62 may be positioned below the lip portion 54 as illustrated. At the periphery of the lip portion 54, the tray 50 has an upturned fork configuration 56. The upturned fork configuration meshes with a downwardly extending fork configuration 58 that is formed at the lower edge of the cowling 48. A seal 60 may be received within the valley of the upturned fork 56 as illustrated in FIG. 5(a) to weatherproof the engine compartment.

With reference now to FIGS. 5(b) and 5(c), the upturned fork configuration 56 may be replaced with a single flange 64 which extends upward into the downwardly extending fork configuration 58. Two variations on a seal theme are presented in the figures: a ring seal 66 similar to an o-ring may be placed within the valley defined by the tines of the fork configuration or a u-shaped sealing member 68 may wrap a portion of the flange 64 and both the flange 64 and the sealing member 68 may be received by the fork configuration. As will be recognized by those of skill in the art, various other configurations are also possible.

With reference again to FIG. 3, the power head 44 drives a drive shaft 70 (see FIG. 6) which is contained within a generally cylindrical drive shaft housing 72. The drive shaft 70 extends into a lower unit 74 and a bevel gear reversing transmission 76 (FIG. 6) couples the drive shaft 70 to a propeller shaft of a propeller 78. The transmission is shiftable with a shifting rod 79 as is well known.

Figure 6:
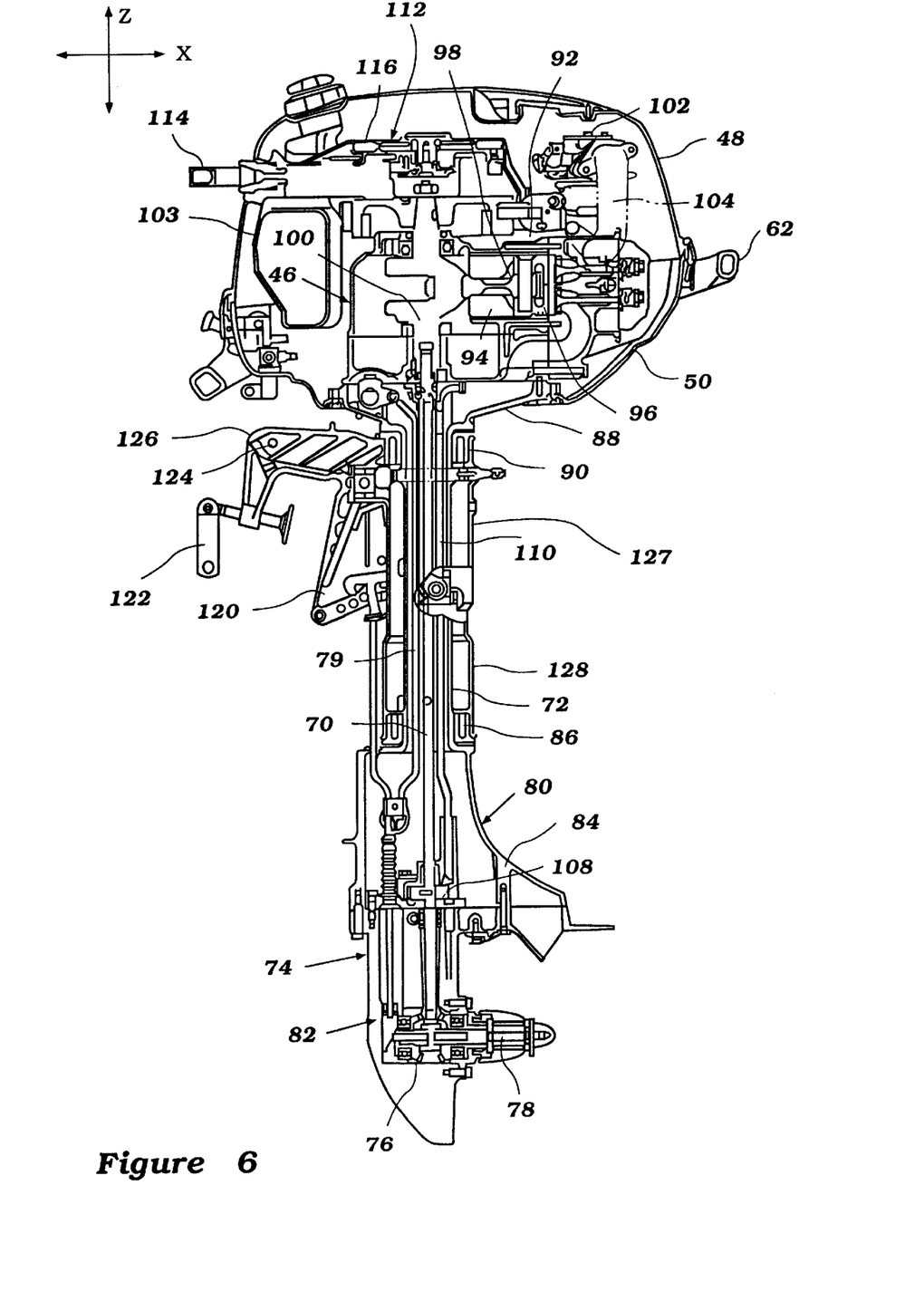
FIG. 6 is a cross-section view of the motor of FIG. 3, illustrating several internal components.

The lower unit 74 is generally comprised of an upper case 80 that is coupled to a lower case 82 via a lower case mounting fixture 84. The lower unit 74, in turn, is coupled to the drive shaft housing 72 with rubber mounts 86. At its upper end, the drive shaft housing is fixed to the power head with a mounting plate 88 through a second set of rubber mounts 90.

The engine 46 is, in this embodiment, preferably of the single cylinder type and desirably operates on the two-stroke crankcase compression principal. As will be recognized by those of skill in the art, the principal of operation, the number of cylinders and the cylinder orientation can also be varied. With reference to FIG. 6, the illustrated engine includes a cylinder block 92 with a single cylinder 94 defined therein. A piston 96 is slidably supported in the cylinder bore 94. The piston 96 is connected by means of a connecting rod 98 to a throw of a crankshaft 100 for driving it in a known manner.

Air is delivered to a carburetor 102 through an air intake box. Fuel is delivered from a fuel tank 103 to the carburetor and an air/fuel charge is delivered to a combustion chamber through an air intake pipe 104. The air/fuel charge is combusted in a known manner and the resulting exhaust gases are discharged from the engine also in a known manner.

The engine is desirably liquid cooled through a known cooling system. As such, water is picked up through a water intake port 106 (FIG. 3) and pumped to the balance of the cooling system by a water pump 108 (FIG. 6) powered off of the drive shaft 70. The water is supplied to engine and exhaust cooling jackets through a coolant pipe 110. The coolant is then returned to the body of water in which the watercraft is operating in a known manner, typically a portion is returned along with the exhaust being discharged from the engine.

The illustrated engine 46 also is provided with a manual recoil starter system 112. As is known, a pull-handle 114 extends into the cowling 48. The pull handle is at the end of a pull cord that is wrapped about a spring-biased starter dog clutch (not shown) within a starter case 116. The starter dog clutch will engage the starter pulley when spun at a sufficient speed and drive the crankshaft to initiate combustion and engine operation. The engine will then begin operation under its own power as known within the art.

As introduced above, the motor 40 is attached to the transom 42 of the watercraft via a clamping and steering bracket. The clamping bracket 120 is affixed to the transom 42 with a screw assembly 122. A pivot pin 124 is carried by the clamping bracket 120 and supports a swivel unit, indicated generally by the reference numeral 126, for tilting movement of the power head 44, drive shaft housing 72 and lower unit 74 about a horizontally disposed axis as defined by the pivot pin 124.

The swivel bracket 126 is engageable with a tilt rod assembly that is engageable in a selected one of apertures in the clamping bracket 120 so as to set the trim angle of the outboard motor 40 relative to the transom 42. The swivel bracket 126 has an integral bearing portion 127 in which a steering shaft 128 or a portion of the drive shaft housing is supported for pivotal movement about the Y axis in a known manner.

Because the above-described environment is well known, further details are considered unnecessary as they are well within the range of knowledge of those of skill in the art. Accordingly, any omitted details are considered non-essential to those of skill in the art, as those of skill would be readily able to implement the below-described invention in lieu of such details.

A tiller arm mounting bracket 130 is secured to the cowling 48 in any suitable manner. The illustrated tiller arm mounting bracket 130 is bolted to the cowling; however, a variety of other fastening arrangements can also be used. A tiller arm or handle 132 is mounted to the bracket 130 in accordance with aspects of the present invention, several embodiments of which will be described in detail below. The tiller arm 132 may be moved left and right to move the motor 40 for steering. Additionally, the tiller arm 132 may be rotated up and down about the Y axis to allow the tiller arm 132 to be positioned for the operator's comfort regardless of the tilt or trim position of the motor 40.

Figure 7:
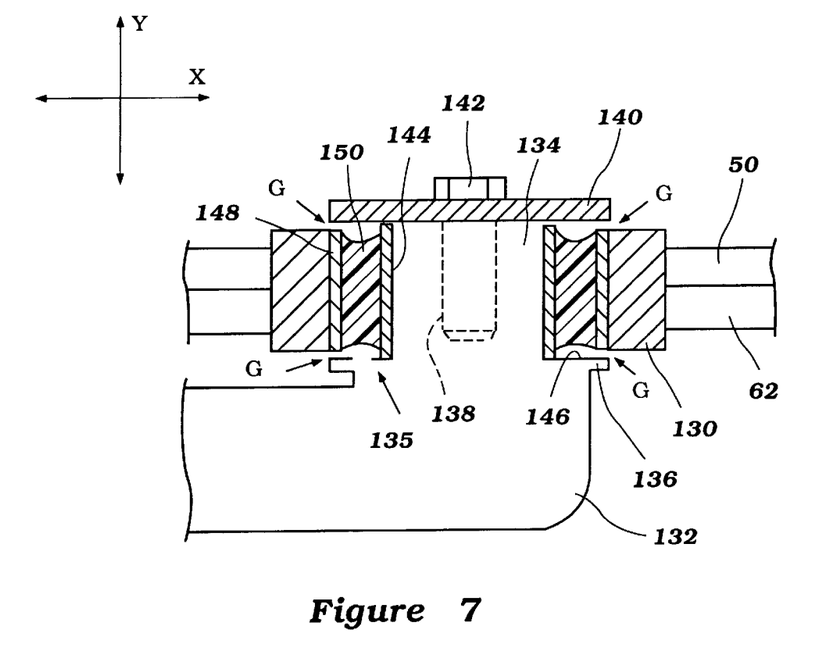
FIG. 7 is a partially sectioned view of the tiller arm mounting arrangement of FIG. 3 taken through line 7—7.

With reference now to FIG. 7, the tiller arm 132 has a mounting boss 134 extending in the Y direction located near a distal end or root 131 of the tiller arm. As illustrated, the mounting boss 134 is desirably cylindrical with a blind tapped hole 138 in the distal end of the mounting boss. Other geometrical shapes may also be used where rotation about the Y-axis is not important. A flat washer 140 abuts on the distal end of the mounting boss 134 and may be affixed thereto using a threaded fastener 142.

An inner sleeve 144 surrounds the boss 134 and is sandwiched between the flat washer 140 and an end surface 146 of a shoulder 135. Thus, the inner sleeve 144 may rotate with the boss 134 of the tiller arm 132 or, more preferably, may allow the boss to move relative to the inner sleeve yet allow sufficient friction between the ends of the sleeve 144 and the surface 146 and flat washer 140, respectively, to keep the tiller arm in a suitable orientation determined by the operator. The shoulder 135 also has a pair of extensions 136 that extend outward from the shoulder 135 and which may be of any geometrical shape. In the illustrated embodiment, the extensions 136 are rectangular.

An outer sleeve 148 is affixed to the tiller arm mounting bracket 130 and may or may not be moveable relative to the bracket 130. Preferably, the sleeve 148 is not moveable relative to the bracket 130. Advantageously, a gap G is defined between the ends of the sleeve 148 and the washer 140 and the surface 146. The gap G eliminates any direct transfer of vibrations from the sleeve 148 and the tiller arm 132 through the surface 146.

A resilient spacer sleeve 150 may be interposed between the two sleeves 144, 148. The resilient spacer sleeve may be made of any suitable material, but is preferably a vibration damping material such as rubber. Similar to the sleeve 148, the spacer sleeve 150 is also desirably sized such that any vibrations traveling therethrough cannot be directly transferred to the surface 146 or the washer 140. Thus, the gap G extends alongside the spacer sleeves as well as the outer sleeve 148.

Figure 8:
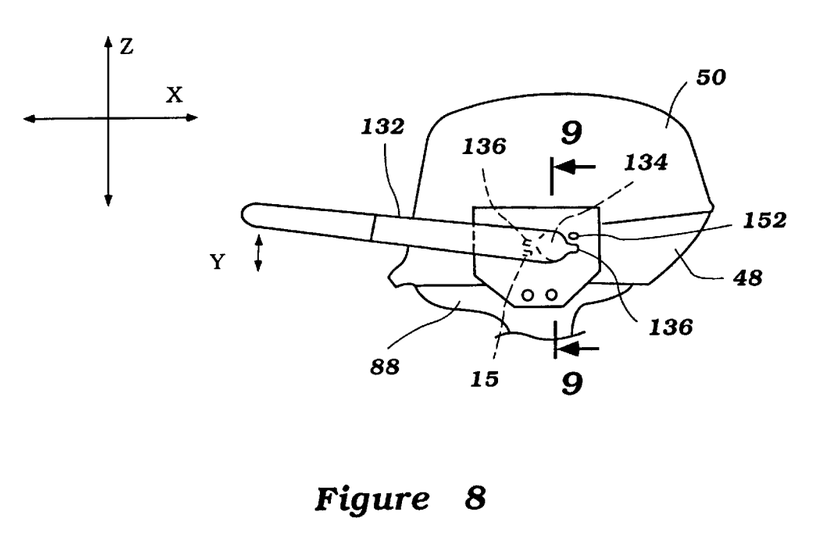
FIG. 8 is a schematic view of the outboard motor of FIG. 3 illustrating another presently preferred tiller arm mounting arrangement.

The assembly desirably has stops (FIG. 8) 152 that extend outward from the mounting bracket 130. The stops 152 may be separately or integrally formed with the mounting bracket 130. The extensions 136 of the tiller arm 132 may abut against the travel limiting stops 152 as illustrated in FIG. 8 to define a range of movement about the Y axis for the tiller arm 132.

Figure 9:
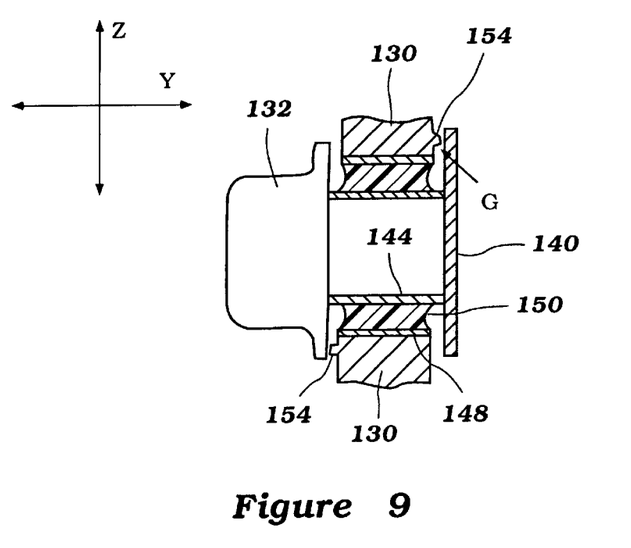
FIG. 9 is a partially sectioned view of the tiller arm mounting arrangement of FIG. 8 taken through line 9—9.

Another embodiment, similar to the above-described embodiment, only differs by removing the travel limiting stops 152 and integrating contact elements 154 (FIG 9). As illustrated, the contact elements 154 may extend to both sides of the bracket 130 or they may be positioned on a single side of the bracket 130. If the stops are on both sides of the bracket 130, then the washer must extend outward a sufficient distance to contact the contact elements 154. In the illustrated embodiment, the positioning of the contact elements at diametrically opposite positions about the rotational axis of the boss 134 helps reduce movement about the X axis by the boss because the contact elements 154 are on opposing sides of the mounting bracket. Thus, a torsional moment is counteracted by the contact elements, while the relatively small size of the elements 154 reduces the likelihood of binding among the members 140, 130, and 132.

Figure 10:
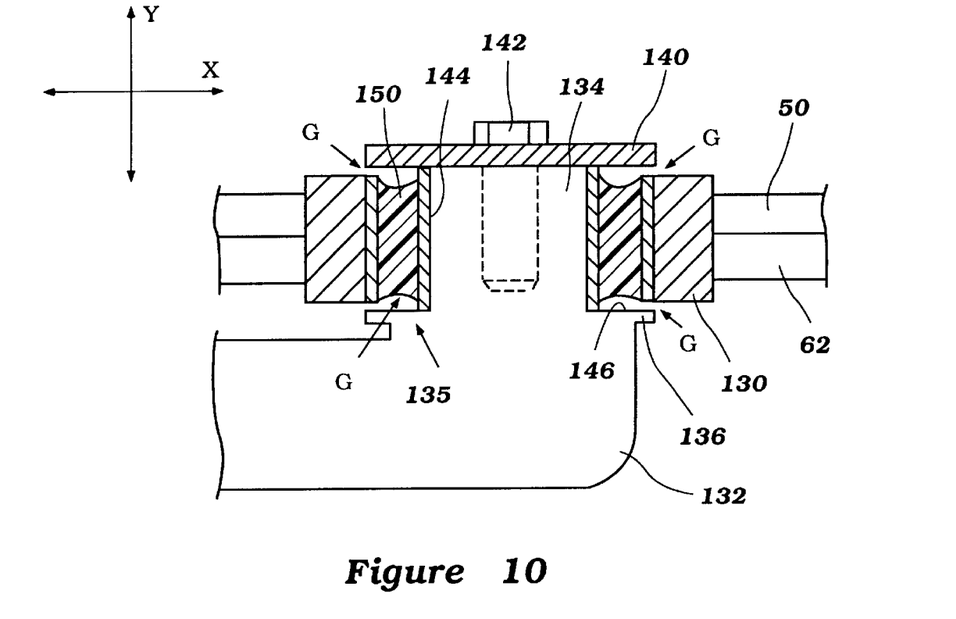
FIG. 10 is another presently preferred tiller arm mounting arrangement.

With reference now to FIG. 10, yet another variation is illustrated. In the embodiment illustrated therein, the outer sleeve 148 is removed and the spacer sleeve 150 is preferably baked, bonded, press-fit or otherwise directly attached to the mounting bracket 130. According to this embodiment, the removal of the outer sleeve 148 reduces elements and may reduce manufacturing costs. Additionally, removing the outer sleeve 148 removes one more element which could wear or fail, thereby improving the reliability of the tiller arm mounting arrangement.

Figure 11A:
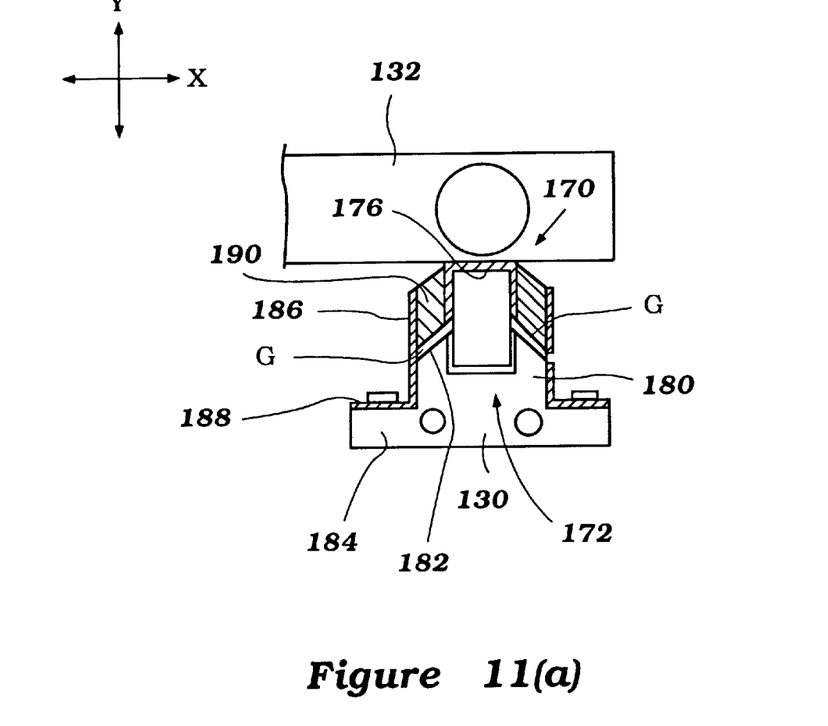
FIGS. 11(a) and 11(b) preset yet another presently preferred tiller arm mounting arrangement.

A further mounting arrangement will be described with reference to FIGS. 11(a) and 11(b). As illustrated in FIG. 11(a), a vibration reducing gap G is defined between an upper portion 170 and a lower portion 172 of the mounting arrangement which reduces or eliminates direct transmission of vibration between the mounting bracket 130 and the tiller arm 132.

Figure 11B:
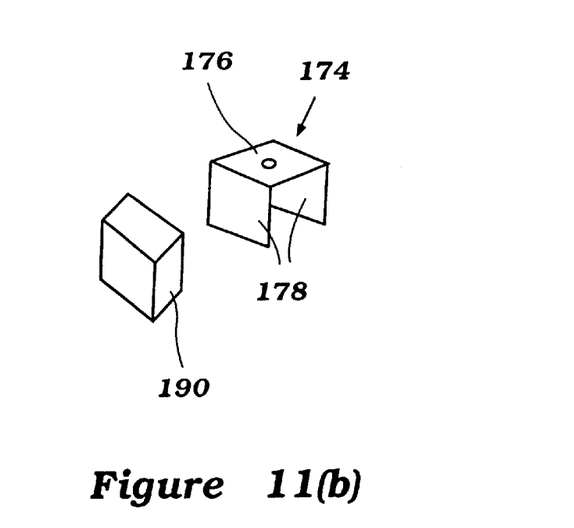

More specifically, as illustrated best in FIG. 11(b), the upper portion 170 is comprised of a flange 174 having a base 176 and two downwardly depending arms 178. While the illustrated flange 174 shown as cubical, it is anticipated that a cylindrical structure may also be used in order to allow for rotational movement of the tiller arm about the Y axis. In such an embodiment, the flange 174 might comprise a circular base with a cylindrical wall depending therefrom.

The base 176 may be directly mounted to the tiller arm 132 using any suitable method. As illustrated in FIG. 11(a), the mounting bracket 130 generally comprises a block 180 having sloped faces 182 and a mounting flange 184. A receiving sleeve 186 surrounds the block 180 and extends upward from the mounting flange 184. The receiving sleeve 186 may have a mounting collar 188 that is secured to the mounting flange 184 through threaded fasteners or the like. The receiving sleeve 186 desirably extends upward to a location above the upper edge of the sloped faces 182 and more desirably extends upward to a location below the base 176.

With reference to FIG. 11(b), at least one resilient member 190 (i.e., for a cylindrical embodiment) but preferably two resilient members (i.e., as illustrated) extend between the receiving sleeve 186 and the arms 178. As illustrated, the resilient member is formed as a parallelogram but need not be. Moreover, the resilient member may be any vibration absorbing material but is preferably a rubber material. Additionally, the resilient members each may be baked, bonded, press fit or otherwise secured to the two members 186, 178.

Figure 12A:
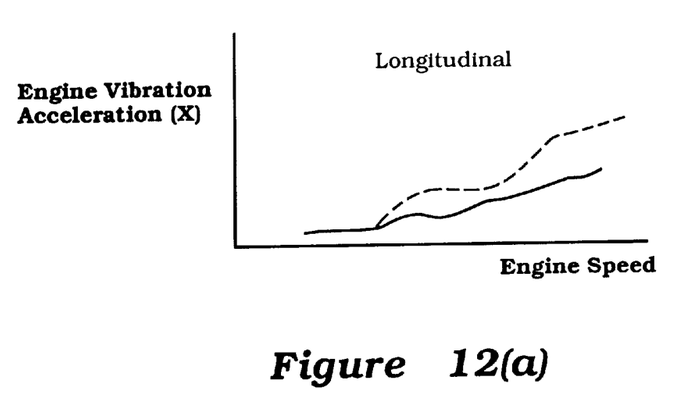
FIGS. 12(a)–12(c) illustrate vibrational transmission in the X, Y and Z directions of a tiller arm mounting arrangement having features, aspects and advantages in accordance with the present invention and of the prior embodiments.
Figure 12B:
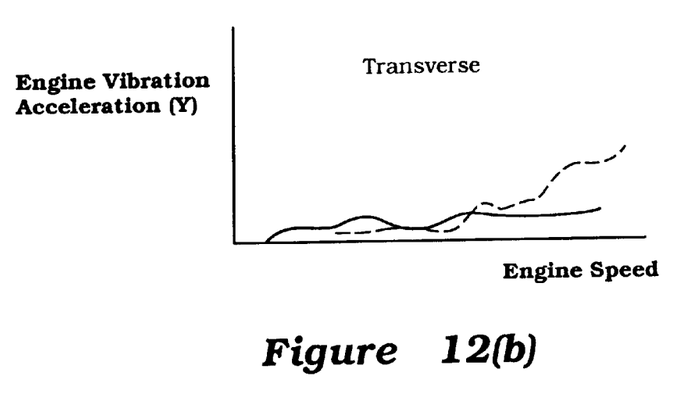
Figure 12C:
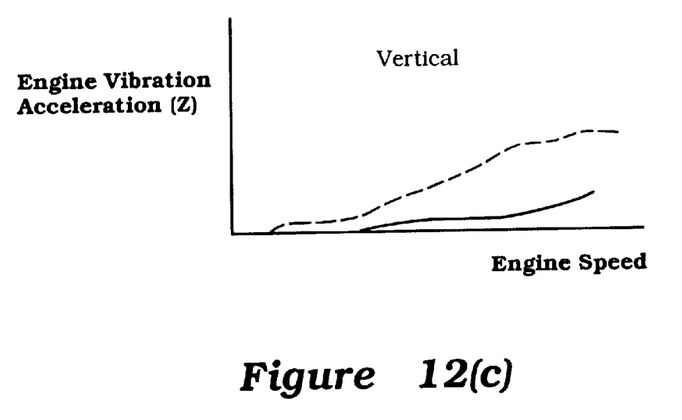

By providing a gap G between the engine side and the tiller arm side of the mounting arrangement, the mounting arrangement reduces the transmission of vibrations. With reference now to FIGS. 12(a)–12(c), graphical representations of vibration transmission to the handle in each of the orthogonal directions X, Y and Z, respectively. The data reflecting the above-described embodiments is illustrated in solid line while earlier embodiments are depicted in dashed lines. As illustrated, the vibrations are greatly reduced over earlier embodiments of tiller mounting arrangements through use of the present invention.

Although this invention has been described in terms of certain presently preferred embodiments, other embodiments apparent to those of ordinary skill in the art also are within the scope of this invention. Thus, various changes and modifications may be made without departing from the spirit and scope of the invention. Accordingly, the scope of the invention is intended to be defined only by the claims that follow.

What is claimed is:

1. An outboard motor comprising a power head, a mounting bracket connected to the power head, an outer sleeve having an exterior surface abutting against the mounting bracket and an interior surface abutting against an exterior surface of a resilient member, the resilient member having a central axis an interior surface of the resilient member abutting against an exterior surface of an inner sleeve, an interior surface of the inner sleeve positioned adjacent a transversely extending mounting boss of a tiller arm and extending transversely between a washer and a mounting surface of the tiller arm such that the inner sleeve may be compressed by the washer and the mounting surface, a first gap defined between the resilient member, the outer sleeve and the washer, a second gap defined between the resilient member, the outer sleeve and the mounting surface such that vibrations must pass through the outer sleeve to the resilient member then through the resilient member into the inner sleeve prior to being transferred to the tiller arm and the resilient member being capable of movement in two directions along the central axis relative to the mounting bracket.

2. An outboard motor comprising a body and a tiller arm, the body comprising a power head and a mounting bracket connected to the power head, a resilient member juxtaposed between the mounting bracket and a mounting structure of the tiller arm, the resilient member joined to the mounting structure through an inner surface wherein a gap is defined at both ends of the resilient member between the resilient member and the next adjacent surface such that vibrations must pass through the inner surface of the resilient member into the tiller arm, a set of extensions arranged on the tiller arm and a corresponding set of stops arranged on the body, the set of stops and the set of extensions cooperating to define a range of movement of the tiller arm relative to the body.

3. The outboard motor of claim 2, wherein the resilient member is a cylindrical sleeve having an inner annular surface.

4. The outboard motor of claim 2, wherein the resilient member has sloping ends.

5. The outboard motor of claim 2, wherein the stops are arranged on the mounting bracket of the body.

6. The outboard motor of claim 2, wherein the resilient member is manufactured from a rubber compound. housing and the handle and a contact element being arranged on the handle such that it may selectively contact the engine housing.

7. An outboard motor comprising an engine within a housing and a handle, the handle being attached to the engine housing through a resilient member, the resilient member being arranged so as to freely vibrate within a gap defined between the engine housing and the handle and a contact element being arranged on the handle such that the contact element may selectively contact the engine housing, whereby a range of movement of the handle relative to the engine housing is limited.

8. The outboard motor of claim 7, wherein the handle includes a mounting boss that extends from a root in a transverse direction from the handle, the gap defined between the resilient member and the root.

9. The outboard motor of claim 8, wherein the resilient member is mounted to the engine housing through a sleeve.

10. The outboard motor of claim 9, wherein a mounting bracket secures the sleeve to the engine housing.

11. The outboard motor of claim 8, wherein a mounting bracket secures the resilient member to the engine housing.

12. The outboard motor of claim 11, wherein the resilient member is baked to the mounting bracket.

13. The outboard motor of claim 11, wherein the resilient member is press-fit into the mounting bracket.

14. The outboard motor of claim 11, wherein the resilient member is bonded to the mounting bracket.

15. An outboard motor comprising a power head, a steering bracket adapted to be connected to a wall of a watercraft, a mounting bracket connected to the power head, a steering handle mounted to the mounting bracket and arranged separately of the steering bracket, the mounting bracket comprising an opening, the steering handle comprising a transversely extending mounting boss, the mounting boss having a peripheral surface and the mounting boss extending toward the mounting bracket and into the opening of the mounting bracket, an outer sleeve comprising an exterior surface and an interior surface, at least a portion of the exterior surface of the outer sleeve abutting against a portion of the mounting bracket, a resilient member comprising an exterior surface and an interior surface, the exterior surface of the resilient member abutting against the interior surface of the outer sleeve, an inner sleeve comprising an exterior surface and an interior surface, the interior surface of the resilient member abutting against the exterior surface of the inner sleeve, the inner sleeve being secured against substantial movement relative to the tiller arm, a first gap defined between the resilient member, the outer sleeve and the washer and a second gap defined between the resilient member, the outer sleeve and the mounting surface.

16. The outboard motor of claim 15, wherein the mounting boss further comprises a peripheral surface and the interior surface of the inner sleeve contacts at least a portion of the peripheral surface of the mounting boss.

17. The outboard motor of claim 15, wherein the steering handle comprises at least one member that cooperates with another member to limit a range of movement of the steering handle relative to the power head.

18. The outboard motor of claim 15, wherein the power head comprises an upper cowling and the steering handle is attached to the upper cowling.

19. The outboard motor of claim 15 further comprising at least one vibration isolator disposed between the steering bracket and the remainder of the outboard motor.

20. An outboard motor comprising a power head, a mounting bracket connected to the power head, a resilient member juxtaposed between the mounting bracket and a mounting structure of a tiller arm, the resilient member joined to the mounting structure through an inner surface wherein a gap is defined at both ends of the resilient member between the resilient member and the next adjacent surface such that vibrations must pass through the inner surface of the resilient member into the tiller arm, the mounting bracket having at least two stops and the tiller arm has at least two corresponding extensions such that the extensions may individually contact the corresponding stop to define a desired range of motion of the tiller arm relative to the power head.

21. The outboard motor of claim 20, wherein the resilient member is a cylindrical sleeve having an inner annular surface.

22. The outboard motor of claim 20, wherein the resilient member has sloping ends.

* * * * *

UNITED STATES PATENT AND TRADEMARK OFFICE
CERTIFICATE OF CORRECTION

PATENT NO.   : 6,149,475
DATED        : November 21, 2000
INVENTOR(S)  : Yoshiaki Tasaka et al.

It is certified that error appears in the above-identified patent and that said Letters Patent is hereby corrected as shown below:

<u>Title page,</u>
Item [56] insert the following,
-- U.S. PATENT DOCUMENTS
    5,778,503  10/1930  Lord
    4,392,640   7/1983  Kakimoto     FOREIGN PATENT DOCUMENTS
    0,230,897  12/1984  Japan --

Signed and Sealed this

Fourteenth Day of May, 2002

*Attest:*

*Attesting Officer*

JAMES E. ROGAN
*Director of the United States Patent and Trademark Office*